May 24, 1927.

W. F. CLARK 1,629,478

TIRE CARRIER

Filed June 17, 1926

Inventor
William F. Clark,
by Harold J. Clark,
Attorney

Patented May 24, 1927.

1,629,478

UNITED STATES PATENT OFFICE.

WILLIAM F. CLARK, OF WOLLASTON, MASSACHUSETTS.

TIRE CARRIER.

Application filed June 17, 1926. Serial No. 116,565.

My present invention relates to automobile tire carriers, and more particularly to such carriers adapted to cooperate with the wing sides of pick-up truck bodies, particularly of the present Ford pick-up type.

With the advent of the Ford so-called "pick-up body," having wing sides, an extremely difficult problem has been presented, viz, the provision of a suitable tire carrier therefor. Since there is a door on the driver's side of the truck, as well as on the opposite side of the cab, it is impractical to carry the spare tire on the running board, as has been done, as it would seriously interfere with entrance to and exit from the driver's seat. Furthermore, it is not feasible to mount a tire carrier on the rear or back of such pick-up bodies, as they are constantly in the way, and there is always present the danger of being injured or marred by being struck from behind.

An important feature of my present invention, therefore, is the provision of a novel tire carrier, positioned and arranged so that it is out of the way of the driver, leaving both doors to the cab free of access, is removed from proximity to the ground, and thus tends to keep oil, dirt and other injurious matter from the tire, and yet leaves the spare tire in an extremely accessible position, where it may be removed and replaced with a minimum of effort and labor.

A further feature of the present invention is the provision of a tire holder or carrier of simple construction, economical of manufacture, easy to install, and accessible when in position.

A still further feature of my novel tire carrier is that it is constructed of a minimum number of parts, is strong and rigid, and free from rattles.

In addition to the foregoing, I preferably utilize the wing side of said pick-up bodies, whether on the right or left hand side, or both, as a cooperating part of my tire carrier, adding the strength and rigidity of the wing side as a load-carrying and strain-resisting element of the holder.

Preferably my novel carrier is applied to the forward left hand side of the truck body, but it will be appreciated that I am not limited thereto, but may apply same to either side, and at substantially any point throughout the length of the body, but I have discovered that the positioning of the carrier in the manner illustrated herein, possesses peculiar advantages, which will be readily apparent.

Further features of the invention, novel combinations of parts, and advantages, will be hereinafter more fully pointed out and claimed.

Figure 1:
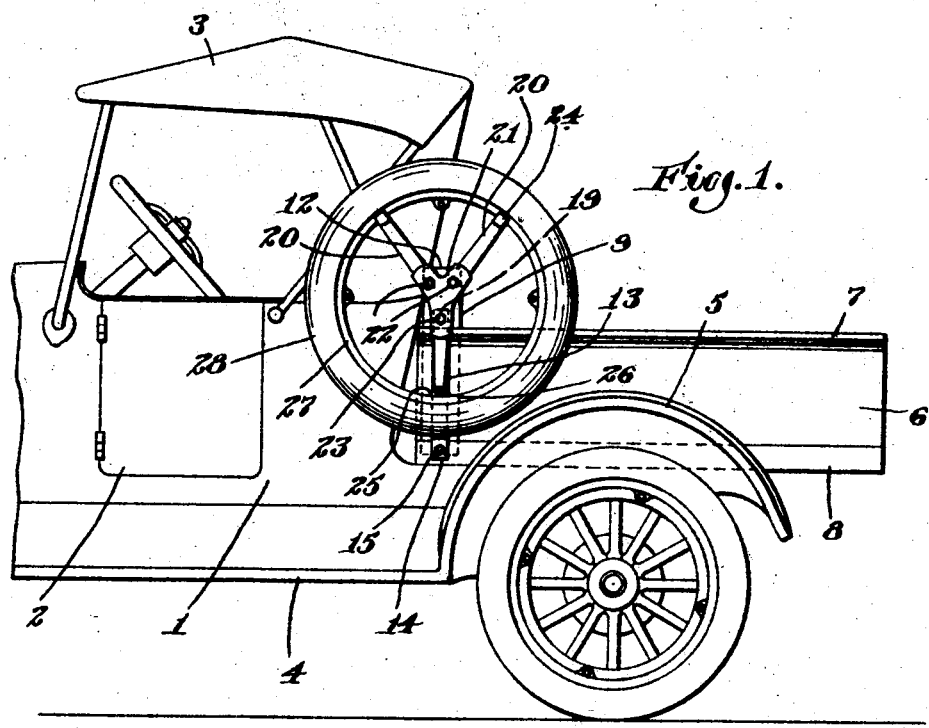
Figure 2:
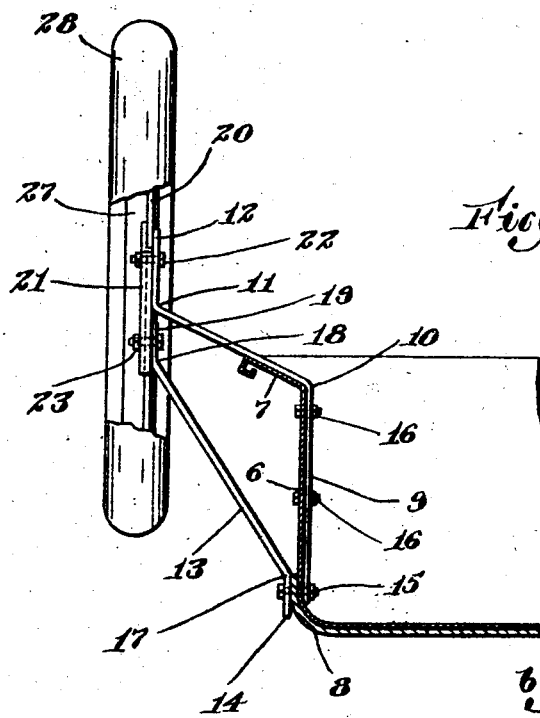

Referring to the drawings, illustrating a preferred embodiment of my present invention, Fig. 1 is a side view of my novel tire carrier applied to the forward left hand wing of a body of the Ford pick-up type;

Fig. 2 being an end view of the tire carrier in position, with the body of the truck sectioned and the tire partly broken away to illustrate the method of attachment.

As shown in the drawings, I have illustrated a pick-up body of the Ford type, generally designated at 1, having a door 2 on the driver's side of the machine, top 3, running board 4 and rear mudguard 5. A pick-up body 6, usually of metal, although it may be of other suitable material, is also provided, having wings 7 on the sides thereof, and a reinforcing brace or sub-body 8, preferably also of metal. My novel tire carrier is preferably mounted on the left-hand forward side of this pick-up body, although it may be on either or both sides and at any point throughout the length of the body. I have discovered, however, that the location shown is peculiarly advantageous, because of the proximity of same to the driver, handiness to the tools, out of the way of the driver's door, remote from the running board, above the mudguard and removed from danger of oil or dirt collecting on the tire from the road. In constructing the tire carrier, I utilize a strap or brace 9, extending approximately from the inside bottom edge of the body 6 upwardly, being bent as illustrated at 10 to conform to the bend of the wing 7, and thence extended upwardly, at an oblique angle, along the top of the wing 7 and outwardly, to a point 11, where it is again bent or angled to extend directly upward or vertically as an arm 12. I have discovered that suitable dimensions for this strap 9 are 4" in width by ¼" in thickness, although it will be understood and appreciated that I am not limited thereto, but may make this strap of any desired size and thickness. A second arm or brace 13 has an end 14 abutting against the reinforce 8 of the truck body and a bolt or rivet 15 extends through said second brace, through the reinforce 8, body 6 and first brace 9, firmly and securely holding same in place. Preferably this second brace 13 will be of relatively narrower width than that of the first brace 9. I find that 1" or 1½" stock is sufficiently strong for this purpose. Bolts or rivets 16 also extend through the body 6 and brace 9, holding this brace tightly against the body 6. The brace 13 is angled at 17 and extends upwardly at an oblique angle away from the body 6 to the point 18, where it is again bent or angled to form the vertical arm 19. Tire carrying arms 20, preferably three being utilized in the form of a Y are provided, having an encircling and securing clamp 21 centrally thereof. The clamp 21 is attached to the arm 12 by bolts or the like 22 and to the arm 19 by one or more bolts 23. Usual tire rim holding yokes or retaining members 24 are provided, one of said tire carrying arms 20 being secured to one of the rim lugs 25 by a bolt and nut 26 or suitable lock, the rim 27 and tire 28 resting on the two yokes 24 and being held in place thereby.

Preferably the tire 28, when mounted, will not extend outwardly beyond the outer edge of the mudguard 5, being thus close enough to the side of the body to prevent injury from sideswiping passing cars or other obstructions.

It will be appreciated that I have thus devised a tire carrier which is simple of construction and application, economical of manufacture and comprising a minimum number of parts. Such a tire carrier, positioned and located as it is, obviates the difficulty heretofore experienced of spare tire carrying, as the spares were frequently carried within the body itself—an extremely disadvantageous position—or slung under the body, also an inconvenient position.

I believe that my novel tire carrier is new and useful, and capable of wide application, and therefore claim the same broadly herein.

While I have necessarily described my invention somewhat in detail, it will be appreciated that I am not limited thereto, but may vary the size, shape and arrangement of parts within reasonably wide limits without departing from the spirit of the invention.

My invention is further described and defined in the form of claims as follows:

1. In combination with the wing body of an automobile truck, a brace extending approximately from the inner bottommost edge of said body upwardly and over the wing and having a vertical arm thereon at its upper end, a second brace extending approximately from the outer bottommost edge of said body outwardly and upwardly and terminating in a vertical arm, a tire carrier comprising a plurality of tire supporting arms, a clamp for said tire supporting arms, said clamp being secured to the vertical arms of said braces.

2. In combination with the wing body of an automobile truck, a pair of braces, one extending from approximately the inner bottommost edge of said body upwardly, angled to follow the contour of said wing, and terminating in a vertical arm, the other extending from approximately the outer bottommost edge of said body, angled upwardly and outwardly and terminating in a vertical arm below said first vertical arm, means securing both said braces to said body at a common union near their lower edges, means securing said first brace to said body above said common union, and a tire carrier united to the vertical arms of said braces.

In testimony whereof, I have signed my name to this specification.

WILLIAM F. CLARK.